(No Model.) 5 Sheets—Sheet 1.

G. A. LOWRY.
SMOKE HOUSE APPARATUS.

No. 595,856. Patented Dec. 21, 1897.

Witnesses:
Wm. J. Henning
Luth S. Alter

Inventor:
George A. Lowry
By Frank T. Brown
Attorney (No Model.)  5 Sheets—Sheet 2.
G. A. LOWRY.
SMOKE HOUSE APPARATUS.
No. 595,856. Patented Dec. 21, 1897.
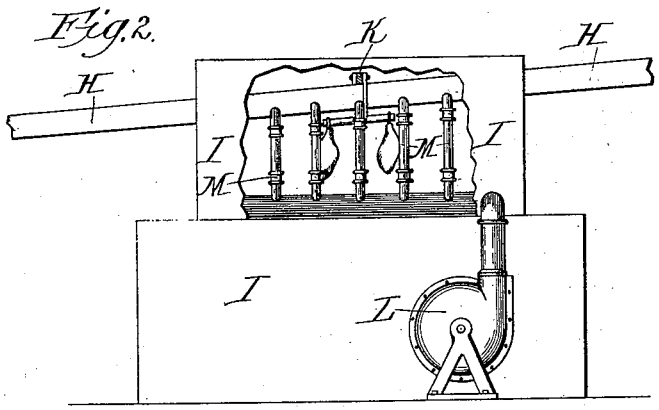
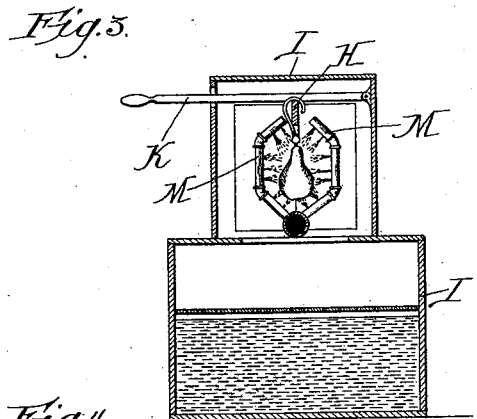
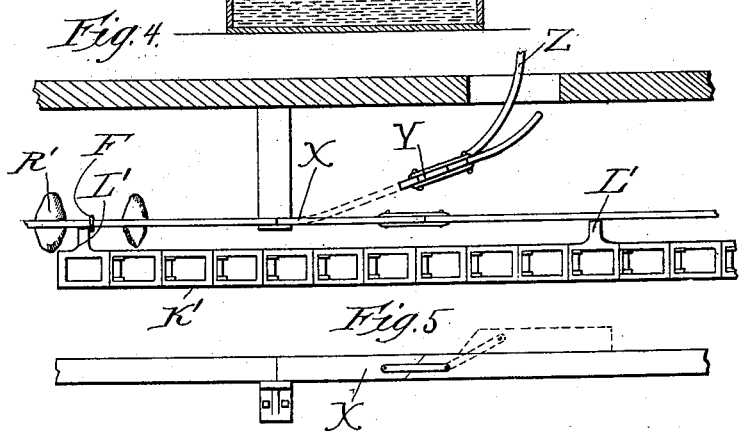

(No Model.) 5 Sheets—Sheet 3.
G. A. LOWRY.
SMOKE HOUSE APPARATUS.
No. 595,856. Patented Dec. 21, 1897.
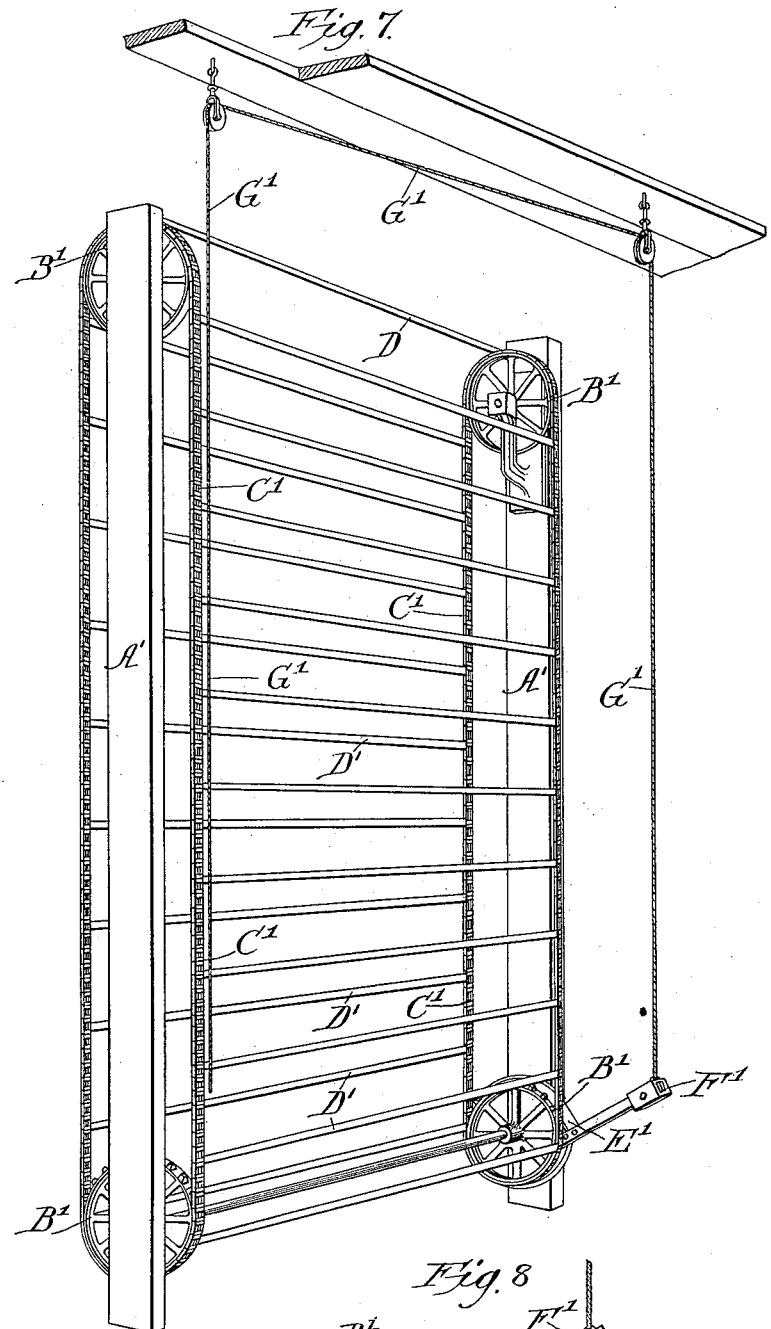
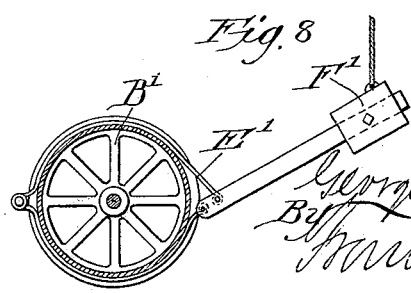

(No Model.) 5 Sheets—Sheet 4.
G. A. LOWRY.
SMOKE HOUSE APPARATUS.
No. 595,856. Patented Dec. 21, 1897.
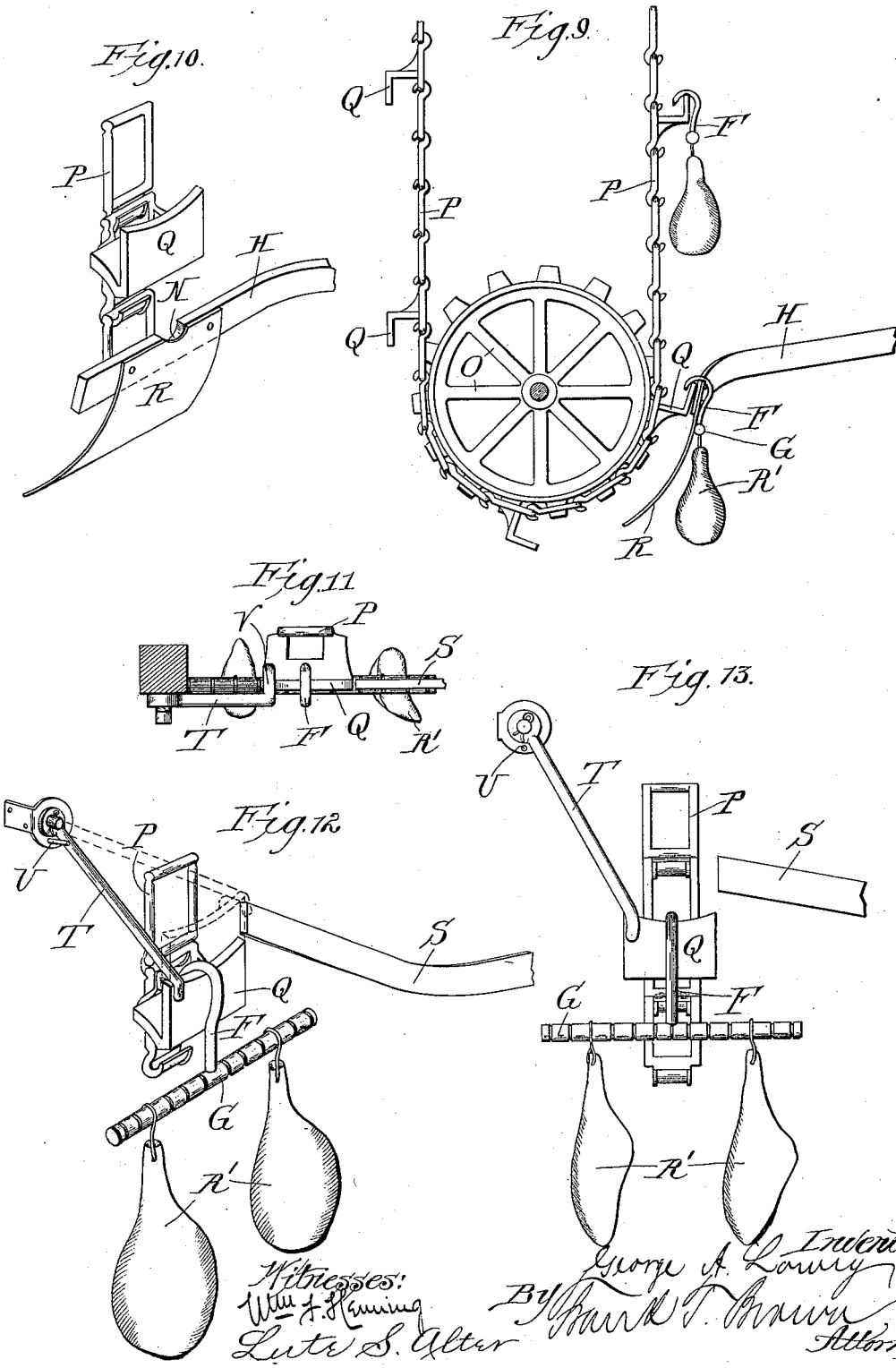

(No Model.)  
5 Sheets—Sheet 5.
G. A. LOWRY.
SMOKE HOUSE APPARATUS.
No. 595,856. Patented Dec. 21, 1897.
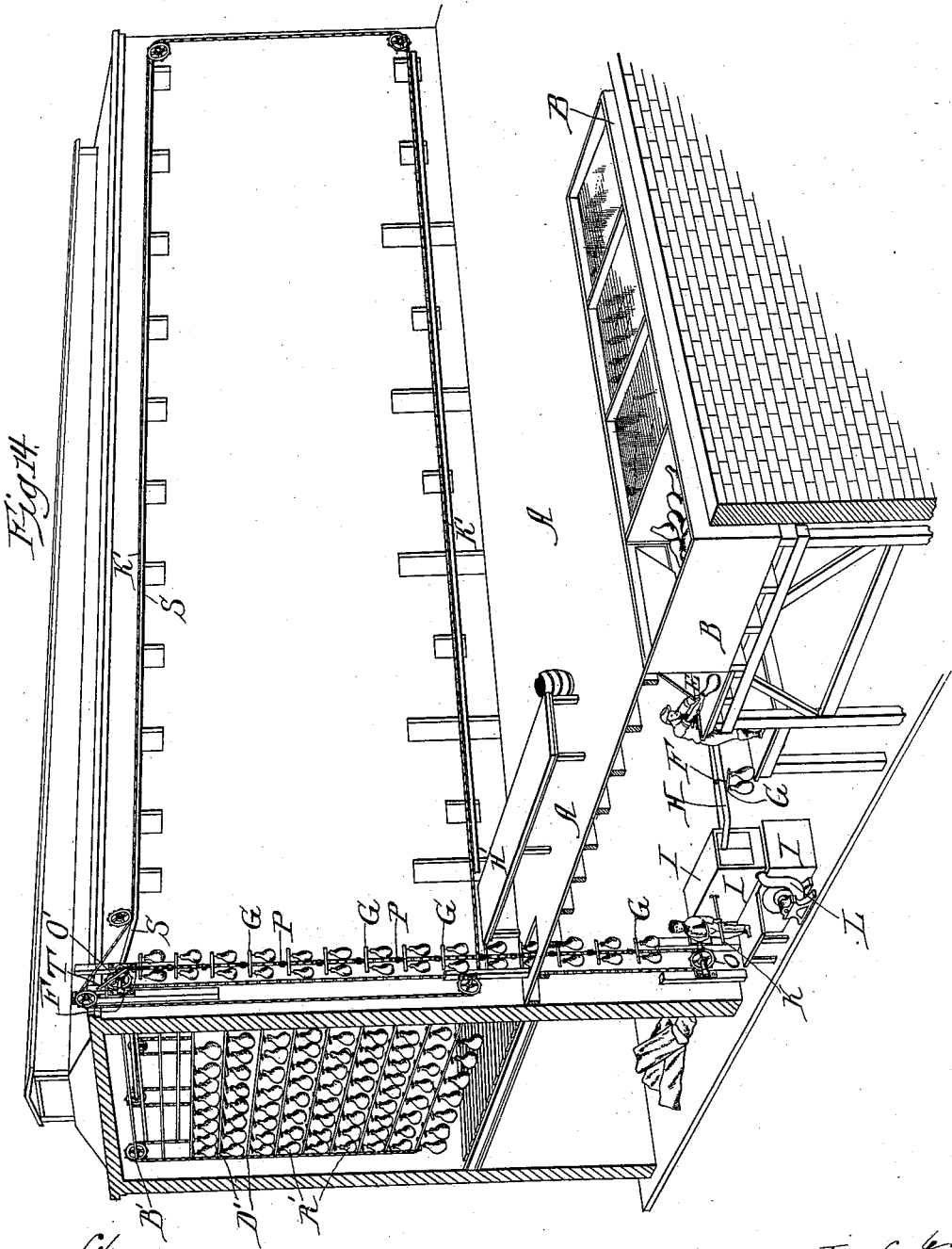

UNITED STATES PATENT OFFICE.

GEORGE A. LOWRY, OF CHICAGO, ILLINOIS.

SMOKE-HOUSE APPARATUS.

SPECIFICATION forming part of Letters Patent No. 595,856, dated December 21, 1897.

Application filed May 14, 1894. Serial No. 511,098. (No model.)

*To all whom it may concern:*

Be it known that I, GEORGE A. LOWRY, a citizen of the United States, residing at Chicago, in the county of Cook and State of Illinois, have invented new and useful Improvements in Processes of and Apparatus for Preparing Meats for Smoke-Houses, of which the following is a specification.

This invention relates to a process and apparatus for preparing meats for the smoke-house and handling the same.

The object of the invention is to simplify the manner of handling meat and economize labor.

The invention consists, substantially, in the process and apparatus shown in the accompanying drawings, set forth in the subjoined specification, and more particularly pointed out in the claims.

Like letters refer to the same parts in the several figures of the drawings, in which—

Figure 1:
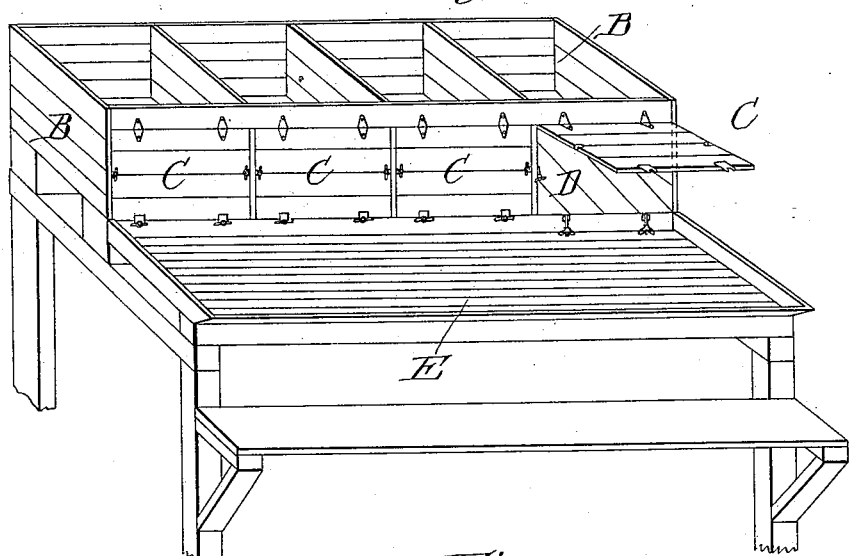
Figure 6:
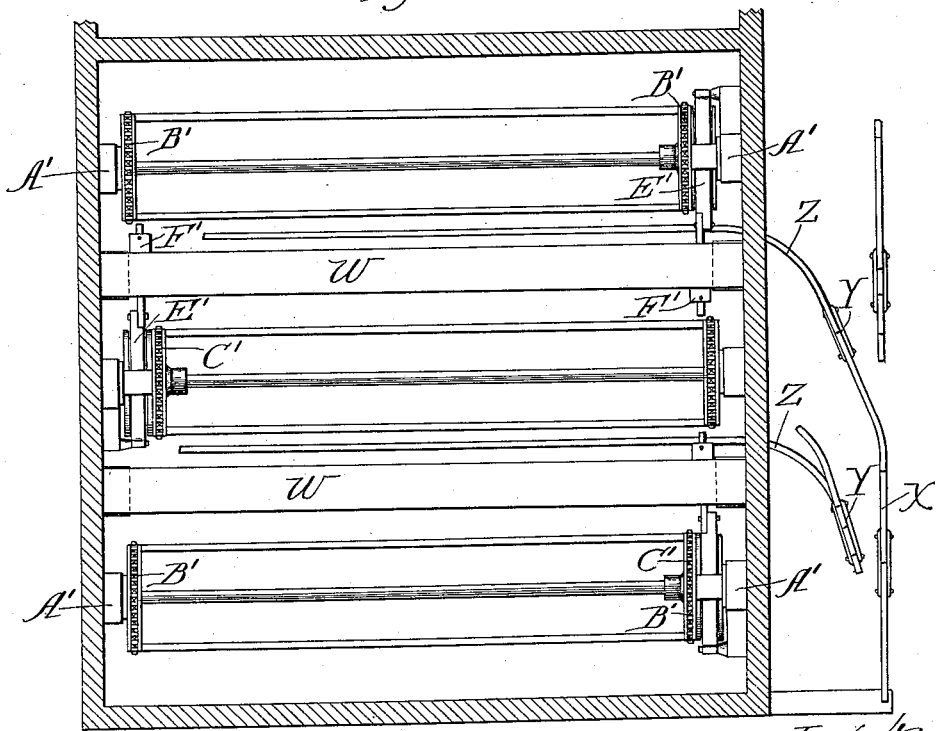

Figure 1 is a perspective view of the soaking-vats. Fig. 2 is a side elevation, partly broken away to show the interior construction of the washing apparatus. Fig. 3 is a vertical cross-section of the same. Fig. 4 is a plan view of the rail or track from the outside of the smoke-house, together with switches leading into the same and a traveling blade for forcing the meat along such track, with a part of the smoke-house wall in section. Fig. 5 is a side elevation of a portion of the track, showing the hinged section in place and thrown back, as indicated by the dotted lines. Fig. 6 is a horizontal section of the top portion of the smoke-house, showing the endless gravity-ladders in plan. Fig. 7 is a perspective view of one of the endless gravity-ladders. Fig. 8 is a detail view of a brake for use with such ladder. Fig. 9 is a side view of a portion of the lifting-chain and its sprocket and the inclined track and gambrel resting thereon in a position to be lifted therefrom by the hooks of the chain. Fig. 10 is a detail view in perspective of a link of the chain and a portion of the inclined track adjusted thereto, showing the notch in which rests the hook of the gambrel and the screen or fender depending from such track. Fig. 11 is a plan view of a portion of the lifting-chain with a loaded gambrel thereon and the automatic discharging-arm. Fig. 12 is a perspective view of the same. Fig. 13 is a side elevation of the same; and Fig. 14 is a perspective view of the entire apparatus, with the end of the smoke-house in section to show the interior mechanism and the outside floor broken away to show the mechanism thereunder.

The first part of the invention which will be described relates to the construction of the soaking-vats or hogsheads for soaking. Heretofore it has been quite the usual custom to mount vats or hogsheads for soaking purposes upon the floor, to lift the meat up from the floor or off the trucks and place it in the soaking-vats, and after it was sufficiently soaked for the person to stand in the vat or hogshead and lift the meat out, which operation of course required much time and labor to perform.

According to the present invention the vats are not built upon the main floor A, but rest upon a substructure in the basement, and their open tops are flush with the floor A. The contents of the trucks can then be dumped directly into the vats, which latter I designate by the letters B. After the meat has been soaked a suitable time the water is drawn off in any proper manner and the front portion of the vats is opened by means of the hinged doors C, and as the bottoms of the vats or partitions therein in which the meat rests, and which is shown at D in Fig. 1, are inclined toward the front the meat will automatically slide from the vats and onto a stringing table or trough E, which table or trough is, as will be seen in Fig. 14, arranged below the main floor A. A man stands in front of this table or trough and strings the meat upon a gambrel in the usual way; but the gambrel itself is peculiarly constructed, for it is formed with a series of circular grooves at a proper distance apart and has a hook extending from its central portion, so that when it is supported by such hook the meat may be adjusted on either side of the same, so as to be balanced on the gambrel. The hook I have designated by the letter F and the grooved rod to which the hook is applied by the letter G. When the meat is thus strung upon the gambrel, the hook is hung upon the inclined track H and the gambrel, with the meat, slides by gravity down the inclined track and into the washing-receptacle I, and would slide entirely through the same except that said hook is stopped by contact with the lever K, which lever is pivoted within the box and rests directly upon the track and has its handle extend through the sides of the box, so as to be grasped by the operator, as is shown in Fig. 14 of the drawings. The box is preferably provided at the end through which the meat enters with two hinged doors swinging inwardly and normally closed by springs, but capable of being opened automatically by the impact of the meat, and at its other end with two outwardly-opening doors. The object of these doors is to keep the steam and spray within the box. A pump L is driven by suitable power and continuously forces hot water through the perforations in the pipe M. It is to be observed that after the meat has been in the soaking-vat for a suitable time it exudes surplus salts and a certain amount of grease, which, becoming mixed with the water, produces a coating or film of slime on the exterior of the meat, and it is the purpose of the washing apparatus just referred to to remove this slime and all dirt it may have previously accumulated. Heretofore it has been quite common to remove this slime by dipping the meat in tepid water and then rubbing the same vigorously with brushes; but this is a laborious operation and comparatively tedious for the reason that the water used cannot be very warm for fear of scalding the hands of the operator, and therefore does not effectively dissolve the slime, which has to be mechanically rubbed off; but with my washing apparatus the meat is fed automatically into the washing-receptacle and is there retained by the lever, while very hot water is sprayed over it, which without manual labor thoroughly cleanses such meat. When the meat is thus cleansed, the boy will move the lever above the hook on the track and allow the gambrel, with its suspended meat, to proceed on its downward course on the track until it has passed through the washing-receptacle and is stopped by the hook of the gambrel resting in the notch N near the end of the track. This notch is best shown in Fig. 10 of the drawings, and the hook in position in such notch is shown in Fig. 9. Of course the gambrel with meat might then be manually carried up and into the smoke-house; but this would be expensive, and accordingly I have provided automatic means for effecting this purpose, which will now be described and which has been found quite advantageous, although of course other automatic means might readily be employed in connection with the other apparatus.

Looking at Figs. 9, 10, and 14 of the drawings, it will be seen that there are provided sprocket-wheels O O', located, respectively, near the top and bottom of the smoke-house, and an endless chain P, passing around such sprocket-wheels and driven by suitable power acting through them. This chain has arranged upon it and preferably cast with it angular lugs or hooks Q, which are placed at suitable distances apart and in their travel successively pass sufficiently close to the ends of the inclined track H to lift therefrom the gambrel supporting the meat and carry the same up to the top of the smoke-house. This is best shown in Figs. 9, 12, 13, and 14 of the drawings.

In order to prevent the meat from catching or striking the under side of the inclined track as it is lifted off the same, I provide a screen or fender R, as best shown in Figs. 9 and 10, which is suitably secured to the track and depends therefrom between the same and the sprocket. After the meat has thus been lifted or carried to the top of the smoke-house it must be removed from the lifting-machine in order to be conveyed within such smoke-house, and for this purpose the following devices are employed:

A track S is arranged along the front of the smoke-house, upon the outside thereof and adjacent to a series of doors, and the end of such track adjacent to the lifting-chain is inclined upwardly, as shown in Figs. 12, 13, and 14 of the drawings. A discharging-arm T is pivoted at one end of the frame of the smoke-house or other suitable point and normally suspended from such pivot and held at an acute angle by a limiting-pin U or other proper device, so that its other end, which is forked, will be in the path of the ascending hooks or angular lugs Q of the lifting-chain. This forked end is preferably composed of one tooth or pin which projects and depends perpendicularly from the end of the arm and another shorter tooth or pin which depends perpendicularly from the horizontal branch V, arranged at right angles to the main frame, as best shown in Fig. 11 of the drawings. When an angular lug of the lifting-chain approaches the end of the track S, carrying with it the gambrel and meat, its top edge will be embraced by the forked end of the discharging-arm, as is best shown in Fig. 12 of the drawings, and as the chain continues to rise the discharging-arm will also be lifted and caused to slide along the top of the angular arm and push before it the hook of the gambrel until the top surface of the angular arm of the lifting-chain will be flush with the top surface of the inclined end of the track S, by which time the discharging-arm will have reached the position shown in dotted lines in Fig. 12, and will then push the hooked gambrel from the angular arm of the lifting-chain to the track S, and said discharging-arm will itself be lifted a little away and clear of the track and then be carried over the side of the angular arm of the lifting-chain and will by gravity fall and assume its first position. The full lines in Figs. 12 and 13 show the discharging-arm in its first active position, while the dotted lines in Fig. 12 show such discharging-arm just after it has forced the gambrel and meat off the angular arm.

As before suggested, the track S extends along the front of the smoke-house adjacent to various doors leading into different portions of the same, and within this smokehouse the meat is suspended to be smoked. The means of suspension which I prefer to employ is best shown in Fig. 7 of the drawings and is what I term an "endless gravity-ladder." These gravity-ladders may be arranged in pairs or other numbers in a smokehouse, but I have shown in Fig. 6 of the drawings three of them arranged in a single smoke-house, because in packing establishments smoke-houses are usually arranged with three rows of suspended meat. Between a pair of gravity-ladders I prefer to arrange a platform for a man who hangs the meat to stand upon, this platform being designated in the drawings by the letter W.

Looking now at Figs. 4, 5, and 14 of the drawings, it will be seen that the track S, extending along the front of the smoke-house, is adjacent to a door and has a hinged section X, which ordinarily forms a part of a continuous track, but when desired to switch meat into any particular door of the smoke-house is lifted back, as shown in dotted lines in Fig. 5, and in its place is put a hinged section Y of a downwardly-inclined switch-track Z, the dotted lines in the same figure showing the position of such hinged section of the switch-track. There is a switch-track for each door, and it preferably extends into and entirely across the smoke-house between a pair of gravity-ladders, as is shown in Fig. 6 of the drawings. The ladders are composed of two upright posts A' A', in each of which are journaled a pair of sprocket-wheels B' B', around which travel sprocket-chains C', which are connected by suitable slats D', preferably made of piping for lightness. The gambrels from which the meat is supported may be hung upon these slats or spokes D' and placed there by the operator in a manner which will now be described, or may be hung upon any other projections from these chains or aprons.

The sprocket-chains, with their slats, may be normally held in a stationary position by means of a brake E', acting on one of the sprocket-wheels B' and normally put into action by a weight F', but capable of being released through the manipulation of a cord G', which is in easy reach of the operator. The person who is to hang the meat stands upon a platform W between a pair of gravity-ladders, as best shown in Figs. 6 and 7, and these ladders being held stationary by means of the brake he proceeds to hang a suitable number of gambrels upon the topmost slat of the ladder on the side nearest him, and after this slat has been filled he releases the brake, and the weight of the meat will tend to make the topmost slat descend until the top slat from the other side of the ladder is brought to a position adjacent to the operator on the side of the ladder nearest him, and he then proceeds to hang upon this slat a sufficient number of gambrels to fill it. He then releases the brake a second time and the two slats filled with meat descend until another slat which was upon the side farthest from the operator is brought in juxtaposition to him, when he permits the brake to act and stop the revolution of the latter until a third slat is filled. The operation of filling these slats is thus repeated until each slat has been brought near the operator and filled, the others as fast as filled moving out of the way and serving to pull the unfilled slats after them as long as the brake is kept from acting, but as soon as the brake is allowed to act this movement being automatically checked at any point desired. In this manner the loaded slats are caused to automatically move out of the way and feed forward into position successively each unfilled slat. In this way one man at the top of the smoke-house can hang a row of hams upon either side of him from the top to the bottom of the smokehouse without changing his position. This ladder which I have just described is caused to move by gravity, as above suggested, and this is the simplest and preferable way of actuating it; but it will be obvious to any one skilled in the art that, if desired, it may be moved positively by means of any well-known mechanism, such as a pawl-and-ratchet or other device, and such variations would not depart from my generic invention, which will hereinafter be pointed out in the claims. Likewise when the gravity-ladder is employed the brake and brake-shoes already described may be varied without departing from the spirit of the invention, although I prefer the form illustrated and described as the best mode of application and brake.

Heretofore the common method of hanging meat in a smoke-house was for a man upon the lower floor to pass it up to the person above him, and so on until the top of the smoke-house was reached, which of course necessitated employing many persons and was very tedious and laborious, as the meat had to be handled many times.

When the meat is sufficiently smoked, it can be taken down with equal convenience, for by taking the meat from one slat and releasing the brake the loaded slats on the opposite side will overbalance; but in this operation instead of operating from the top of the ladder the person must unload from the bottom of the ladder and the switch-tracks must incline toward the outside in a downward direction instead of, as before, in a downward direction toward the inside. When the meat is thus carried out after being smoked, it may be delivered to a table H' and from thence packed in any suitable way.

It will be observed that if it is desired to have a portion of the track S horizontal, so that all the traveling gravity-ladders will be of the same height, it will be necessary to use some propelling force to move the meat along this horizontal way or track, and for this purpose I have provided a power driving sprocket-chain K', traveling adjacent to the track and furnished with lugs or projections L', as shown in Fig. 4 of the drawings, which strike the hooks of the gambrels and force them along till the proper inclined switch is reached, upon which they descend by gravity, as before described.

In the ordinary smoke-house to accomplish the results which it is the province of my method and apparatus to effect it has heretofore been customary to employ from twelve to sixteen men; but with my apparatus the same effects can be secured by three or four, and not only this, but the operation is more expeditious and less laborious, for instead of the meat being handled so often nearly all of the operation is automatic.

It is obvious that many other modifications other than those alluded to may be made in the details and construction hereinbefore set forth in the accompanying drawings without departing from the spirit of my invention.

Having thus described my invention, what I claim as new, and desire to secure by Letters Patent of the United States, is—

1. In a smoke-house apparatus, the combination of a soaking-tank, a stringing-table, with a washing apparatus and an inclined track passing from the stringing-table to and through the washing apparatus; substantially as and for the purpose set forth.

2. In a smoke-house apparatus the combination with a soaking-tank, a stringing-table, and a washing-receptacle containing perforated pipes and a force-pump, of an inclined track extending from the stringing-table to and through the washing apparatus; substantially as and for the purpose set forth.

3. In a smoke-house apparatus a washing apparatus comprising a closed receptacle containing a series of perforated pipes and a force-pump connected therewith, in combination with an inclined track passing to and through the receptacle for conveying the meat suspended from a hooked gambrel and an automatic stop to retain the gambrel and meat suspended therefrom within such washing-receptacle until it is properly cleansed; substantially as and for the purpose set forth.

4. In a smoke-house apparatus the combination of a soaking-tank having an inclined bottom and hinged front, of a stringing-table with a washing apparatus containing a series of perforated pipes connected to a force-pump and an inclined track leading therethrough and a hinged lever normally resting upon such track but capable of being lifted therefrom, whereby the meat may be detained in the washing apparatus until cleansed, and then allowed to slide through and beyond the same; substantially as and for the purpose set forth.

5. In a smoke-house apparatus, the combination with an elevating device provided with a projecting arm of a gambrel for supporting the meat, having a hook engaging such arm, a discharging-arm arranged in the path of travel of the elevating device in position to engage the gambrel and discharge the same, and the track adjacent to such elevating device upon which the gambrel may be received, substantially as and for the purpose set forth.

6. In a smoke-house apparatus the combination of an elevating device having a projecting arm adapted to receive the hook of the gambrel supporting the meat, of a pivoted discharging-arm arranged in the path of travel of the elevating apparatus and having a forked end in position to engage the hook of the gambrel and gradually move the same laterally as the pivoted discharging-arm is lifted and a track adjacent to the upper end of the elevating apparatus for receiving the hook of the gambrel when the discharging-arm has forced it off the elevating apparatus, substantially as and for the purpose set forth.

7. In a smoke-house apparatus the combination of an endless power-driven chain provided with angular projecting arms adapted to support the hook of a gambrel for carrying meat with a pivoted discharging-arm having a forked end arranged in the path of the elevating-chain and in position to embrace the sides of the projecting arm and to move the hook of the gambrel laterally as the discharging-arm is lifted, and the track having an inclined end adjacent to the elevating-chain and adapted to receive the hook of the gambrel when the same is moved off the projecting arm of the chain; substantially as and for the purpose set forth.

8. In a smoke-house apparatus the combination of a track extending along the side of the smoke-house, and adapted to receive hooked gambrels for supporting meat, such track having hinged sections and inclined branch tracks also having hinged sections which latter tracks communicate with the smoke-house, and power mechanism consisting of endless belts with projecting arms for engaging the hooks of the gambrels and feeding the same along the main track and delivering the same to said inclined tracks; substantially as and for the purpose set forth.

9. In a smoke-house apparatus the combination of two or more gravity-ladders for supporting the meat arranged within the smoke-house, with tracks arranged outside of the smoke-house and having switches or branches leading between the ladders; substantially as and for the purpose set forth.

10. The combination with a smoke-house, of a gravity-operated ladder arranged therein comprising an endless chain or apron provided with slats for sustaining the meat to be hung thereon, a brake mechanism for maintaining the ladder in any desired position, and a hand-operated device for releasing said brake mechanism; substantially as and for the purpose set forth.

11. In a smoke-house apparatus, a smoke-house, an endless chain or apron arranged therein and having slats from which the meat may be hung, and the position of the slats may be changed by the gravity of the meat, in combination with devices for retaining the gravity-ladder in any desired position, a platform adjacent to the upper end of the ladder, and a device within reach of the operator standing on said platform for releasing the ladder from the influence of the stop devices; substantially as and for the purpose set forth.

12. In a smoke-house apparatus a smoke-house an endless chain or apron arranged therein and having slats from which the meat is hung and adapted to revolve by gravity of the meat so hung, in combination with a weight-actuated brake for retaining the gravity-ladder in any desired position, and a cord within reach of the operator for releasing the brake; substantially as and for the purpose set forth.

13. In a smoke-house apparatus the combination of a washing apparatus an inclined track leading therethrough a gambrel having a hook traveling upon such track and supporting the meat to be washed, an elevating apparatus adjacent to the end of such inclined track and engaging the gambrel and thereby elevating the meat to the smoke-house, a discharging-arm in the path of the elevating apparatus, a track along the side of the smoke-house, and adjacent to the top of the elevating apparatus upon which the gambrels having the meat are discharged, inclined branch tracks or switches communicating with the interior of the smoke-house and gravity-ladders arranged in such smoke-house upon which the meat is hung; substantially as and for the purpose set forth.

In witness whereof I have hereunto set my hand, this 11th day of May, 1894, in the presence of two subscribing witnesses.

GEORGE A. LOWRY.

Witnesses:
S. E. DARBY,
EDNA B. JOHNSON.